UNITED STATES PATENT OFFICE.

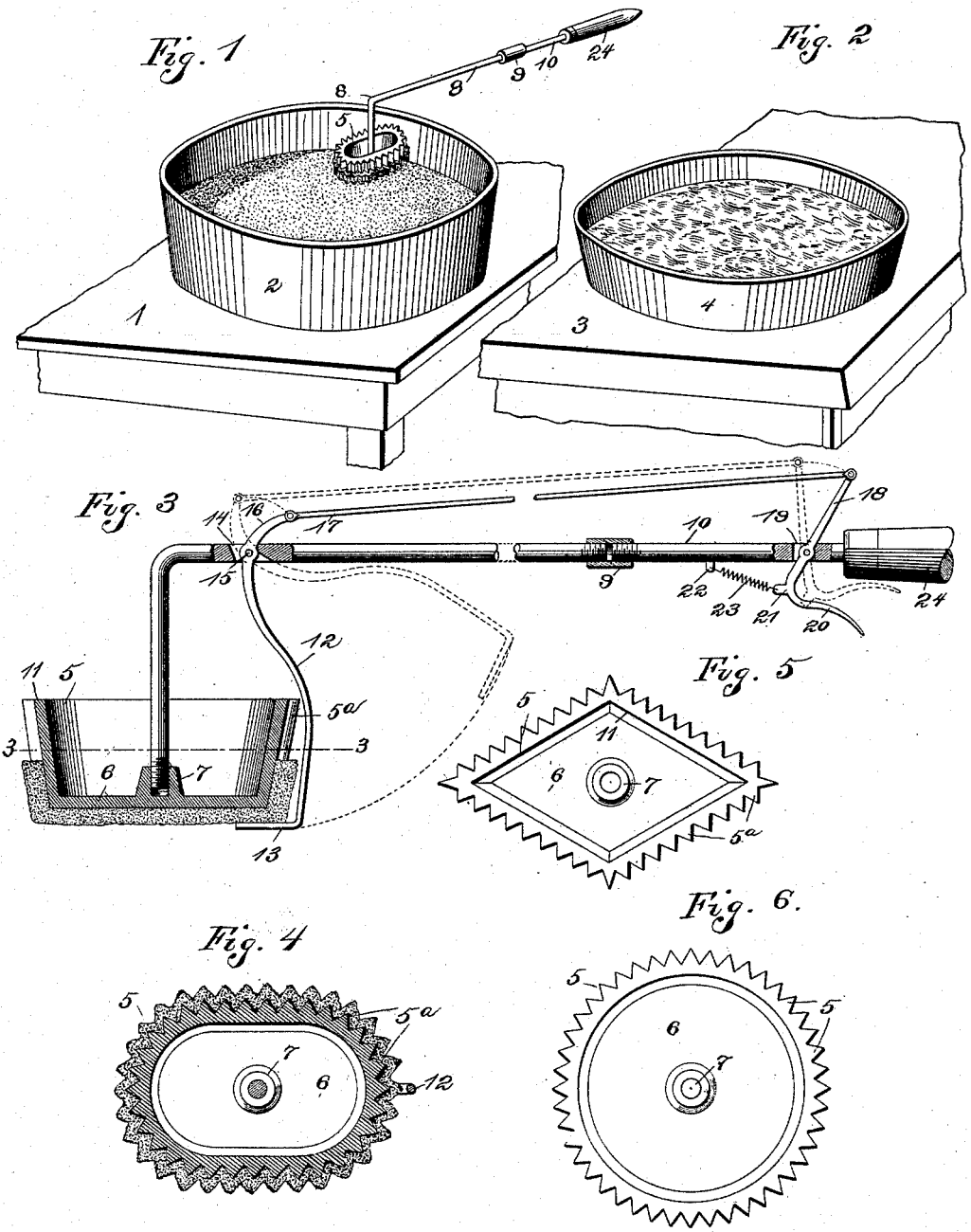

BENJAMIN FRANKLIN METCALF, OF ST. LOUIS, MISSOURI, ASSIGNOR, BY DIRECT AND MESNE ASSIGNMENTS, TO E. S. ALBRIGHT, OF SAME PLACE.

TOOL FOR FRYING BATTER.

SPECIFICATION forming part of Letters Patent No. 522,797, dated July 10, 1894.

Application filed July 17, 1893. Serial No. 480,711. (No model.)

*To all whom it may concern:*

Be it known that I, BENJAMIN FRANKLIN METCALF, of St. Louis, State of Missouri, have invented certain new and useful Improvements in Tools for Frying Batter, of which the following is a full, clear, and exact description, reference being had to the accompanying drawings, forming a part hereof.

Figure 1, is a perspective view, illustrating the method of using my improved tool. Fig. 2, is another view, in which is illustrated a frying pan filled with hot grease, in which the batter is dipped for purposes of cooking. Fig. 3, is a sectional view of the tool. Fig. 4, is a similar view, taken on a horizontal plane, as indicated by line 3—3, Fig. 3. Figs. 5 and 6, are plan views of other forms.

My invention relates to a new and useful improvement in tools for frying batter, and consists, generally stated, in a hollow shell or cup-shaped utensil formed with corrugated side-walls which are formed integral with the bottom, said bottom and side walls being imperforate.

A suitable handle is attached to this cup-shaped utensil, upon which handle is preferably mounted means for retaining the cooked batter on the shell, whereby the same is prevented from falling in its passage from the frying pan to a suitable dish or receptacle.

In the drawings, I have illustrated a table, 1, upon which is shown a pan of batter, 2.

In Fig. 2, I have illustrated at 4 a frying pan, in which is received lard or other material for frying the batter.

3 indicates a portion of the stove for heating the contents of pan 4.

5 indicates a hollow shell or cup-shaped utensil, whose sides and bottom are imperforate, as shown. The side walls of this hollow cup-shaped utensil are preferably formed tapering toward the bottom 6, and are corrugated or fluted, as at 5ª, upon which corrugated or fluted surface the batter is received, as shown in Fig. 3, the corrugations or flutes forming a greater area of an irregular surface 11 to which the batter will more readily adhere.

A suitable boss 7 is formed on the upper side of the bottom 6, which boss is tapped to receive a rod 8, forming part of the handle.

The other end of the rod 8 is preferably connected by a coupling 9 to a rod 10, which forms an extension of the rod 8.

Pivoted at 15, in a slot 14, in the rod 8, near the cup-shaped utensil, is an arm 12, whose lower end is bent, as at 13, which bent portion is adapted to extend beneath the hollow cup-shaped utensil for the purpose of holding the cooked batter thereon, as illustrated at Fig. 3. Connected to the upper member 16 of the arm 12, is a rod or link 17, whose other end is connected to a member 18 of an operating trigger 20, which is pivoted in a slot 19 in the rod 10. Connected to the trigger 20, preferably in an ear 21, is a spring 23, whose other end is attached as at 22 to the rod 10. The tension of this spring is so directed relative to the trigger 20 that the link 17 tends to hold the projection or bent portion 13 of the arm 12 always in position beneath the cup-shaped utensil, said arm and bent portion 13, however, being retracted, as indicated by the dotted lines in Fig. 3, when it is desired to relieve the cup-shaped utensil of its fried batter.

A suitable handle 24 is preferably arranged at the end of the rod 10.

The device, as above described, is adapted to be used as follows: Assuming that suitable batter has been prepared and that a pan of hot grease in which the same may be fried is ready, the cup-shaped utensil is first placed in the hot grease until the same is thoroughly heated, which is readily accomplished by reason of the thin walls and bottom. After the cup-shaped utensil is heated, as above described, it is dipped into the batter a sufficient depth and withdrawn, the batter adhering thereto readily by reason of the corrugated outside surface. It is then placed in the pan and allowed to fry, the heat retained by the bottom 6 and walls 5 cooking the batter on the inside. During the dipping of the hot and greasy cup-shaped utensil into the prepared batter, the trigger 20 is operated to withdraw the bent portion 13 from beneath the shell, and, when the shell with its adhered batter is transferred from the batter receptacle to the frying pan and from the frying pan to the suitable receptacle, the trigger 20 is released, which will permit the parts to assume the position as shown in Fig. 3.

Having thus described my invention, what I claim, and desire to secure by Letters Patent, is—

1. A tool or utensil for frying hollow forms of batter, the same consisting of a cup-shaped shell having a vertically corrugated or fluted periphery, substantially as and for the purposes specified.

2. A tool or utensil for frying hollow forms of batter, the same consisting of a cup-shaped tapering shell having a vertically corrugated or fluted periphery, substantially as and for the purposes specified.

In testimony whereof I affix my signature in presence of two witnesses.

BENJAMIN FRANKLIN METCALF.

Witnesses:
EDWARD E. LONGAN,
JNO. C. HIGDON.